United States Patent Office
3,293,267
Patented Dec. 20, 1966

3,293,267
ESTERS OF DIARYL CARBINOL CARBOXYLIC ACIDS, DIARYL CARBINOL CARBOXYLIC ACIDS AND ANHYDRIDES OF SAID DIARYL CARBINOL CARBOXYLIC ACIDS
John H. McCracken, Monroeville, and Johann G. D. Schulz and Arthur C. Whitaker, Pittsburgh, Pa., assignors to Gulf Research & Development Company, Pittsburgh, Pa., a corporation of Delaware
No Drawing. Filed June 18, 1963, Ser. No. 288,603
23 Claims. (Cl. 260—346.3)

This application is a continuation-in-part of our United States application for Letters Patent, Serial No. 272,578, filed November 30, 1960, now abandoned.

This invention relates to a process for preparing esters of diaryl carbinol carboxylic acids, diaryl carbinol carboxylic acids themselves and anhydrides of said diaryl carbinol carboxylic acids. This invention also relates to esters of diaryl carbinol carboxylic acids, diaryl carbinol carboxylic acids themselves and anhydrides of said diaryl carbinol carboxylic acids as new compounds. The esters, acids and anhydrides described and defined herein can be employed as intermediates in the preparation of plasticizers, plastics and fibers. Additionally the anhydrides can be employed as curing agents for epoxy resins. These new compounds can also be self condensed, in the case of the esters and acids with the elimination of alcohols and water, respectively, to form polymers suitable as coatings, for which one of the possible structures, for example, is illustrated below:

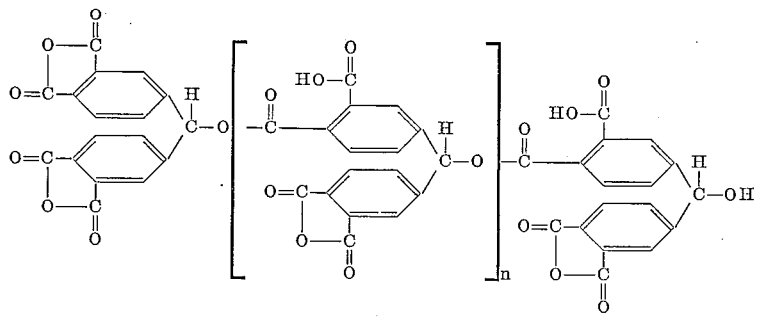

wherein $n$ is an integer greater than one.

As charge for the process of this invention, ketones of the formula

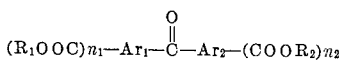

$$(R_1OOC)_{n_1}-Ar_1-\overset{O}{\underset{\|}{C}}-Ar_2-(COOR_2)_{n_2}$$

wherein $Ar_1$ and $Ar_2$ are aryl radicals selected from the group consisting of phenyl, biphenyl, naphthyl, phenanthryl, anthryl, indyl, dihydronaphthyl and cyclohexylphenyl, $R_1$ and $R_2$ are selected from the group consisting of alkyl radicals having from one to 19 carbon atoms, preferably from one to nine carbon atoms, and $n_1$ and $n_2$ have a value from 0 to four with the sum of $n_1$ and $n_2$ being from one to four can be employed. The carboalkoxy groups of the above ketone can include carbomethoxy, carbopropoxy, carboisooctoxy, carbotetradecoxy, carboheptadecoxy, carbononadecoxy, etc. In the preferred ketone charge each of the aryl groups carry one or two ester groups on each of the aromatic rings and are preferably symmetrically arranged thereon. The aryl radicals can carry as nuclear substituents thereon 0 to four radicals selected from the group consisting of primary, secondary and tertiary alkyls having from one to 16 carbon atoms, preferably from one to eight carbon atoms, such as methyl, ethyl, n-propyl, isopropyl, isobutyl, amyl, isoamyl, hexyl, isooctyl, decyl, tetradecyl, hexadecyl, etc., F, Cl, Br, I, $NH_2$, OH, etc. A symmetrical arrangement is one in which both aryl radicals are identical. Specific examples of charges which can be employed are dimethyl ester of benzophenone 4,4′-dicarboxylic acid, tetramethyl ester of benzophenone 3,4,3′,4′-tetracarboxylic acid, tetraisooctyl ester of benzophenone 3,4,3′,4′-tetracarboxylic acid, diethyl ester of benzophenone 2-methyl, 3′-amyl 4,4′-dicarboxylic acid, n-butyl ester of 1 alpha-anthroyl, 2-bromo, 4-hydroxy, 5-carboxyphenanthrene, triisooctyl esters of 3-decyl, 4-cyclohexyl 2′,4′,6′-tricarboxybenzophenone, nonadecylester of 2-alpha-naphthoyl-benzoic acid, di-(3-methyl, 4-carbopropoxy, 6-chloro)-1-naphthylketone, 2,2-dicarbodecoxy, 4,4′-dicyclohexyl, 5,5′-diisooctyl, 6,6′-diaminobenzophenone, di-(1,4-dihydro, 7-hydroxy, 8-carboisooctoxy)-5-naphthylketone, etc.

The ketone charge defined above is converted in accordance with the process of this invention by hydrogenation to the desired ester of a diaryl carbinol carboxylic acid. The ketone charge being solid can not normally be subjected to the desired hydrogenation conditions. Prior to hydrogenation, therefore, the ester is admixed with a suitable carrier. The carrier, however, must be selected with extreme care and caution. In order to obtain maximum yields of esters of diaryl carbinol carboxylic acids under the reaction conditions defined herein, particularly at a selected temperature level, the carrier for the hydrogenation reaction must be a liquid alkanol. If it is desired to avoid any transesterification during hydrogenation the alkanol carrier employed should correspond to the ester grouping on the ketone charge. Thus, if a methyl ester of a diarylketone carboxylic acid is charged to the hydrogenation reaction, the alcohol carrier should be methanol. With an ethyl ester in the ketone charge, ethanol should be employed as carrier. A hydrocarbon carrier such as hexane, heptane, octane, dodecane, amylene, diisobutylene, dodecene, benzene, toluene, mesitylene, etc. as carrier during the hydrogenation reaction defined herein must be avoided, for at any selected temperature level the ketone charge would have a tendency to be converted preferably to the ester of a diaryl methane carboxylic acid rather than the desired ester of a diaryl carbinol carboxylic acid. By proper selection of carrier for the hydrogenation reaction, therefore, the defined process can be directed to the desired compound. Sufficient carrier should be employed to maintain the mixture of ketone charge and carrier in a fluid state. Thus at least about 50, preferably about 400 to about 600 percent, by weight of carrier relative to the ketone charge is sufficient.

The hydrogenation reaction leading to the desired esters of diaryl carbinol carboxylic acids is carried out by subjecting the mixture defined above to suitable hydrogenation conditions. Thus a temperature of at least about 110° C., preferably about 120° to about 180° C., and a pressure of at least about 300 pounds per square inch gauge, preferably a pressure of about 500 to about 1500 pounds per square inch gauge, is sufficient. The specific temperature required to produce the desired esters of diaryl carbinol carboxylic acids will be dictated by the number of ester groups on the aryl rings. Thus, when two ester groups are present, one on each of the aryl groups, hydrogenation can be effected throughout the defined range. With four ester functions present, two on each of the aryl groups, the temperature should be maintained within a range of about 120° to about 150° C. A contact time of at least about 15 minutes, preferably about 0.5 to about three hours, is also sufficient. Hydrogenation catalysts which can be employed include nickel, cobalt, copper chromite, etc. At least about two percent by weight, preferably about five to about 10 percent by weight, of catalyst based on the ketone charge is satisfactory. Stoichiometric amounts of hydrogen are consumed.

At the end of the hydrogenation reaction the contents of the reactor is maintained at a temperature of about 25° to about 100° C. and the hydrogenation catalyst separated therefrom by any suitable means, preferably by filtration. The remainder of the reaction system is then treated in any suitable manner to recover the desired ester of diaryl carbinol carboxylic acid found therein. This can be effected, for example, by cooling the reaction system to room temperature. Some crystallization of the desired product will occur. By evaporation or other suitable means the carrier employed is reduced in volume from 25 to 50 percent. The remainder of the desired esters of diaryl carbinol carboxylic acid will crystallize out of solution and can be separated therefrom by filtration.

The ketone charge employed herein can be obtained from diaryl ketone carboxylic acids of the formula

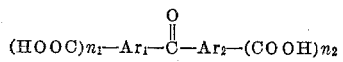

wherein $Ar_1$ and $Ar_2$ and $n_1$ and $n_2$ are identical to $Ar_1$, $Ar_2$, $n_1$ and $n_2$, respectively, defined hereinabove. Specific examples of such diaryl ketone carboxylic acids are benzophenone 4,4'-dicarboxylic acid, benzophenone 3,4, 3',4'-tetracarboxylic acid, benzophenone 2-methyl, 3'-amyl, 4,4'-dicarboxylic acid, 1-alpha-anthroyl, 2-bromo, 4-hydroxy, phenanthrene 5-carboxylic acid, 3-decyl, 4-cyclohexyl 2',4',6'-benzophenone tricarboxylic acid, 2-alpha-naphthoyl-benzoic acid, di-(3-methyl, 4-carboxy, 6-chloro)-1-naphthylketone, 2,2-dicarboxy, 4,4'-dicyclohexyl, 5,5'-diisooctyl, 6,6'-diaminobenzophenone, etc.

Particularly attractive symmetrical diaryl ketone carboxylic acids such as benzophenone 4,4'-dicarboxylic acid or a tetra substituted diaryl ketone carboxylic acid such as benzophenone 3,4,3',4'-tetracarboxylic acid for preparation of the ketone charge can be obtained in accordance with the procedure set forth in U.S. Patent No. 3,075,007, dated January 22, 1963. By "symmetrical" as defined herein we mean an arrangement in which both aryl radicals are identical. Briefly in the process of the patent a 1,1-diarylalkane such as 1,1-di(para)tolylethane is oxidized with nitric acid having a concentration of about five to about 50 percent and a temperature of about 110° to about 350° C. and a pressure of about atmospheric to about 500 pounds per square inch gauge for about one minute to about 48 hours. At the end of this time an amorphous diaryl ketone dicarboxylic acid such as benzophenone 4,4'-dicarboxylic acid precipitates out of the reaction system and can be recovered therefrom by simple filtration.

To prepare the desired ketone charge using the above-identified diaryl ketone carboxylic acids, the first step involves converting the symmetrical diaryl ketone carboxylic acid to the corresponding alkyl ester. This is effected by reacting the symmetrical diaryl ketone carboxylic acid with a suitable alkanol. Desirably the amount of alkanol employed is in excess of the amount stoichiometrically required to react with the diaryl ketone carboxylic acid. Generally at least about 200 and preferably 300 to about 600 percent by weight of alkanol in excess of that stoichiometrically needed to react with the diaryl ketone carboxylic acid is sufficient. About 0.1 to about 10 percent by weight, based on the diaryl ketone carboxylic acid, of an esterification catalyst such as sulfuric acid, hydrochloric acid, toluene sulfonic acid and phosphoric acid can also be employed. The esterification reaction is carried out at a temperature of at least about 64° C., preferably about 100° to about 150° C., and autogenous pressure for at least about ten minutes, preferably about 0.5 to about five hours.

As an example, when the symmetrical diaryl ketone carboxylic acid defined above was admixed with methanol a slurry formed, since the acid was not completely soluble in the methanol. At the end of the esterification period the product was recovered by crystallization and filtration. With excess alkanol present the esterification reaction will proceed to the right and formation of a stable ester is assured.

If desired at this point the hydrogenation catalyst and hydrogen can be added to the reaction mixture and the same subjected to the hydrogenation conditions previously described. In fact, hydrogen and hydrogen catalysts can be added to the original mixture of diaryl ketone carboxylic acid and alkanol and the desired esterification and subsequent hydrogenation can be conducted in one stage. Desirably, however, the alkyl ester of the diaryl ketone carboxylic acid is separated from excess alkanol in any convenient manner and the alkyl ester of the diaryl ketone carboxylic acid is thereafter subjected to the hydrogenation conditions previously described using one of the alkanols defined hereinabove as carrier.

A particularly attractive feature of the present invention resides in the fact that the procedure defined herein provides an extremely attractive route for the production of diaryl carbinol carboxylic acids corresponding to the desired esters of diaryl carbinol carboxylic acids, as well as the anhydrides of said diaryl carbinol carboxylic acids. It would appear that an effective method for preparing diaryl carbinol carboxylic acids would involve the mere hydrogenation of the diaryl ketone carboxylic acids defined hereinabove. The diaryl carbinol carboxylic acids so produced containing two acid functions on adjacent carbon atoms on the aryl ring and at least two carbon atoms removed from the bridge carbonyl would then merely be heated and dehydration would result in the production of the corresponding anhydride. The two acid functions would have to be so located, for in the dehydration step some reaction would occur between an adjacent acid function and the bridge carbonyl to produce lactones instead of the desired anhydrides. When attempts have been made to hydrogenate diaryl ketone carboxylic acids, in a number of carriers such as water, methanol, tertiary butanol and dioxane, however, little or none of the desired reaction took place and in most instances salts of the hydrogenation catalyst were produced instead.

The esters of the desired diaryl carbinol carboxylic acids resulting from the hydrogenation procedure defined herein can be converted to the corresponding acids by saponification. Thus, the ester of the desired diaryl carbinol carboxylic acid can be reacted with at least the stoichiometric amount of an alkaline material, such as sodium hydroxide, potassium hydroxide, calcium hydroxide, ammonium hydroxide, preferably in an aqueous solution, at a temperature of about 25° to about 200° C. and a pressure of about 0 to about 200 pounds per square inch gauge for a period of time which can be from about 10 minutes to about 10 hours. At the end of such period the solution is cooled and acidified with at least a stoichiometric amount of strong mineral acid, such as hydrochloric acid, sulfuric acid, phosphoric acid, nitric acid, etc. at a temperature of about 25° to about 100° C. and atmospheric pressure.

The desired diaryl carbinol carboxylic acid can be recovered from solution in any suitable manner. If the desired acid is solid it can be recovered from the mixture by filtration. If the desired acid is still in solution, the mixture can be heated to evaporate water therefrom to a point wherein the desired acid will come out of solution and can be recovered by filtration. The recovered acid can be dried at a temperature of about 50° to about 100° C. and a pressure of about two inches to about 30 inches of mercury. To obtain the corresponding anhydride from the acid so produced wherein the two acid functions are on adjacent carbon atoms on the ring and are at least two carbon atoms removed from the bridge carbonyl, the acid is merely heated at a temperature of about 100° to about 200° C. and a pressure of about two inches to about 30 inches of mercury for a period which can be from about one minute to about 24 hours in order to drive off water therefrom.

The process of this invention can further be described by reference to the following examples:

Example I 672 grams of 1,1-di(para)tolylethane were oxidized with 6000 grams of nitric acid having a concentration of 25 percent at a temperature of 204° C. and a pressure of 350 to 400 pounds per square inch gauge for two hours. The benzophenone 4,4'-dicarboxylic acid recovered amounted to 830 grams. Into a two-gallon, glass-lined autoclave equipped with a stirrer and steam jacket there was charged 700 grams of the benzophenone 4,4'-dicarboxylic acid so produced, five liters of methanol and 20 grams of aqueous sulfuric acid having a concentration of 95 percent. The autoclave was closed and the contents heated with stirring to 135° C. This was continued for one hour at an autogenous pressure of 130 pounds per square inch gauge. At the end of this time the autoclave was cooled to room temperature and the slurry withdrawn and filtered. The solid recovered was a powdery dimethyl ester of benzophenone 4,4'-dicarboxylic acid. 100 grams of the dimethyl ester of benzophenone 4,4'-dicarboxylic acid was slurried in 500 milliliters of methanol and the slurry placed in a one liter stainless steel stirred autoclave. Twenty grams of nickel catalyst (Harshaw 0104) were also added to the autoclave. The autoclave was heated to 170° C. and pressured with hydrogen to 1000 pounds per square inch gauge. It was held at this pressure for three hours, then allowed to cool, depressured and opened. Large crystals were observed in the reaction mixture from the autoclave. These crystals were dissolved by mild warming to a temperature of about 40° C. The solution was filtered to remove catalyst therefrom and the catalyst was washed with 250 grams of methanol and the washings added to the filtrate. The methanol solution was then reduced to a volume of about one-half liter by evaporation. The product, 94 grams of the dimethyl ester of benzhydrol 4,4'-dicarboxylic acid, crystallized out of solution and was recovered.

Example II 100 grams of the dimethyl ester of benzophenone 4,4'-dicarboxylic acid was slurried in 340 grams of heptane and the slurry placed in a one liter stainless steel stirred autoclave. 20 grams of a nickel catalyst similar to that used in Example I were also added to the autoclave. The autoclave was heated to 195° C. and pressured with hydrogen to 1500 pounds per square inch gauge. It was held at this pressure for three hours and allowed to cool, depressured and opened at a temperature of about 50° C. The reaction system was filtered to remove the catalyst therefrom. The filtrate was reduced in volume by evaporation and crystallization occurred. 60 grams of white crystals analyzing as the dimethyl ester of diphenyl methane 4,4'-dicarboxylic acid were thus recovered.

Example III

A solution of 100 grams of the tetramethyl ester of benzophenone 3,4,3',4'-tetracarboxylic acid in 500 milliliters of methanol was hydrogenated in a one-liter autoclave over 300 grams of nickel catalyst (Harshaw 0104). The reactor was heated to 100° C., pressured to 1000 pounds per square inch gauge and then run under these conditions for three hours. The reactor was then cooled, blown down and the contents filtered through Celite to remove the catalyst therefrom. The resulting solution was concentrated to 300 milliliters and cooled. No reduction occurred, since the solid product which precipitated was shown to be starting material by infrared analysis.

Example IV

A solution of 50 grams of the tetramethyl ester of benzophenone 3,4,3',4'-tetracarboxylic acid in 500 milliliters of methanol was hydrogenated over five grams of nickel catalyst (Harshaw 0104) at 135° C. and at 1000 pounds per square inch gauge for two hours. The reactor was cooled, blown down and the contents filtered through Celite. The resulting solution was evaporated to a colorless viscous liquid which was analyzed to be the tetramethyl ester of benzhydrol 3,4,3',4'-tetracarboxylic acid.

Example V

A solution of 100 grams of the tetramethyl ester of benzophenone 3,4,3',4'-tetracarboxylic acid in 500 milliliters of methanol was hydrogenated over 15 grams of nickel catalyst (Harshaw 0104) at 150° C. and 1000 pounds per square inch gauge for one hour. The methanol solution, resulting was worked up in the manner employed in Example IV resulting in an analysis indicating a product of which 83 percent was the tetramethyl ester of benzhydrol 3,4,3',4'-tetracarboxylic acid and the remainder was shown to be the tetramethyl ester of diphenyl methane 3,4,3',4'-tetracarboxylic acid by physical recovery.

Example VI

A slurry of 29 grams of the tetramethyl ester of benzophenone 3,4,3',4'-tetracarboxylic acid in 150 milliliters of heptane was hydrogenated in a 300 milliliter autoclave over five grams of nickel catalyst (Harshaw 0104) at 150° C. and 1000 pounds per square inch gauge for five hours. The reactor was cooled and the product washed with methanol. The methanol-heptane solution was filtered through Celite and the filtrate evaporated to 24.5 grams of a yellow-green oil. Chromatography of a portion of this product on alumina indicated that it was the tetramethyl ester of diphenyl methane 3,4,3',4'-tetracarboxylic acid.

Example VII

A solution of 31 grams of the tetraisooctyl ester of benzophenone 3,4,3',4'-tetracarboxylic acid in 150 milliliters of methanol was hydrogenated over three grams of nickel catalyst (Harshaw 0104) at 155° C. and 1000 pounds per square inch gauge for 2½ hours. The organic solution resulting from normal work up was evaporated to give 24 grams of a colorless, viscous oil which was found to be the tetraisooctyl ester of benzhydrol 3,4,3',4'-tetracarboxylic acid.

Example VIII

A solution of 100 grams of the tetraisooctyl ester of benzophenone 3,4,3',4'-tetracarboxylic acid in 500 milliliters of heptane was hydrogenated over 15 grams of nickel catalyst (Harshaw 0104) at 155° C. and 1000 pounds per square inch gauge for two hours. The resulting solution, after normal work up, was evaporated to give 98 grams of a colorless, viscous oil, of which 68 percent was found to be the tetraisooctyl ester of benzhydrol 3,4,3',4'-tetracarboxylic acid. The remainder of the product was the tetraisooctyl ester of diphenyl methane 3,4,3'4'-tetracarboxylic acid.

Example IX

A solution of 95 grams of the tetraisooctyl ester of benzophenone 3,4,3',4'-tetracarboxylic acid in 500 milliliters of heptane was hydrogenated over 15 grams of nickel catalyst (Harshaw 0104) at 185° C. and 1000 pounds per square inch gauge for two hours. The resulting solution gave, after work up and evaporation, 86.8 grams of a yellow-green oil which was dissolved in acetone and filtered through activated alumina to remove suspended catalyst therefrom. The acetone was evaporated to give 85.1 grams of a colorless, viscous oil which was found to be the tetraisooctyl ester of diphenyl methane 3,4,3',4'-tetracarboxylic acid.

From the above it can be seen that in order to obtain high yields of esters of diaryl carbinol carboxylic acids at a designated temperature level it is imperative that hydrogenation be effected in the presence of an alkanol carrier. Even when the hydrogenation reaction was conducted at a temperature level with a hydrocarbon carrier in an attempt to facilitate conversion of the ester of a diaryl ketone carboxylic acid to the corresponding ester of a diaryl carbinol carboxylic acid greater yields of the desired esters of diaryl carbinol carboxylic acids were obtained at the same temperature level when an alkanol was employed as a carrier. Thus when the hydrogenation reactions of Examples V and VI were carried out at a temperature of 150° C., the former using methanol as carrier and the latter heptane, in Example V most of the product was a benzhydrol ester, while in Example VI all of the product was an ester of a diaryl methane carboxylic acid. In examples VII and VIII the hydrogenation reaction was carried out at a temperature of 155° C. In Example VII wherein methanol was employed as carrier the product was the tetraisooctyl ester of benzhydrol 3,4,3',4'-tetracarboxylic acid, while in Example VIII wherein heptane was employed as carrier only, 68 percent of the product was an ester of the diaryl carbinol carboxylic acid.

The examples below illustrate procedures for obtaining from the desired esters produced above new diaryl carbinol carboxylic acids and anhydrides of said diaryl carbinol carboxylic acids.

Example X 52 grams of the tetramethyl ester of benzhydrol 3,4,3',4'-tetracarboxylic acid and 250 milliliters of an eight percent aqueous sodium hydroxide solution were maintained at reflux for 12 hours at a temperature of 100° C. and atmospheric pressure. The colorless solution was then acidified with 150 grams of a 38 percent aqueous hydrochloric acid solution. After evaporation of the water the resulting solid was extracted with acetone. The acetone-soluble portion yielded on evaporation a white solid which was identified as benzhydrol 3,4,3',4'-tetracarboxylic acid.

Example XI

The compound obtained in Example X was heated over a period of four hours at a temperature of 170° C. in a vacuum oven at a pressure of two inches of mercury, and the product obtained was identified to be benzhydrol 3,4,3',4'-tetracarboxylic dianhydride.

That diaryl ketone carboxylic acids can not easily be hydrogenated in common carriers to corresponding diaryl carbinol carboxylic acids is apparent from an inspection of the following runs.

Example XII

A slurry of 25 grams of benzophenone 3,4,3',4'-tetracarboxylic acid in 150 milliliters of distilled water was hydrogenated over five grams of nickel catalyst (Harshaw 0104) at 175° C. and 1000 pounds per square inch gauge over 1¾ hours. The green solution remaining after removal of the free catalyst therefrom by passing through Celite was evaporated to dark green viscous oil. This was dissolved in aqueous sodium hydroxide which sprung a large amount of nickel hydroxide. This was filtered off and the filtrate acidified with hydrochloric acid to give the disodium salt of benzophenone 3,4,3',4'-tetracarboxylic acid.

Example XIII

. A slurry of 25 grams benzophenone 3,4,3',4'-tetracarboxylic acid in 150 milliliters of methanol was hydrogenated in a 300 milliliter autoclave over five grams of nickel catalyst (Harshaw 0104) at 135° C. and 1000 pounds per square inch gauge for two hours. The solution, after filtering through Celite, was diluted with 250 milliliters of a 10 percent aqueous sodium bicarbonate solution and then extracted three times with 75 milliliters of ether. The ether solution was evaporated to give 0.3 gram (1 percent by weight) of ester products.

In a second run under similar conditions, 100 grams of benzophenone 3,4,3',4'-tetracarboxylic acid in 500 milliliters of methanol was hydrogenated over 25 grams of the same catalyst for two hours at the same temperature and pressure. The product after evaporation of the methanol was a dark green gum. Addition of acetone precipitated 10 grams of a white solid identified as unreacted benzophenone 3,4,3',4'-tetracarboxylic acid which is insoluble in this solvent. An acetone-soluble portion, after evaporation, had a neutral equivalent of 104, which compares with 90, the theoretical value of benzhydrol 3,4,3',4'-tetracarboxylic acid.

Example XIV

A slurry of 125 grams benzophenone 3,4,3',4'-tetracarboxylic acid in 500 milliliters of methanol was hydrogenated over 25 grams of nickel catalyst (Harshaw 0104) at 150° C. and 1000 pounds per square inch gauge for three hours. The solution, after catalyst removal, was evaporated to a yellow-green solid. The neutral equivalent of the product, after removal of unreacted benzophenone 3,4,3',4'-tetracarboxylic acid, was 105, which compares to 90, the theoretical value of benzhydrol 3,4,3',4'-tetracarboxylic acid.

Example XV

A slurry of 150 grams of benzophenone 3,4,3',4'-tetracarboxylic acid in 500 milliliters of methanol was hydrogenated over 15 grams of barium-promoted copper chromite catalyst at 140° C. and 1000 pounds per square inch gauge for 1¾ hours. The methanol solution, after catalyst removal, was orange in color, indicating incorporation of chromium. After several attempts to remove the chromium by ion exchange the reaction was discarded.

Example XVI

A slurry of 100 grams of benzophenone 3,4,3',4'-tetracarboxylic acid in 500 milliliters of tertiary butanol was hydrogenated over 15 grams of nickel catalyst (Harshaw 0104) at 130° C. and 1000 pounds per square inch gauge for 1¾ hours. The butanol solution, after catalyst removal, was evaporated to give a solid identified as benzophenone 3,4,3',4'-tetracarboxylic acid.

Example XVII

A slurry of 100 grams of benzophenone 3,4,3',4'-tetracarboxylic acid in 500 milliliters of tertiary butanol was hydrogenated over 15 grams of nickel catalyst (Harshaw 0104) at 160° C. and 1000 pounds per square inch gauge for two hours. The reaction mixture removed from the autoclave was a purple pasty mass which smelled of butene. This was filtered and the solids were dissolved in concentrated hydrochloric acid, which caused an immediate formation of black nickel. Apparently the catalyst had been incorporated completely as nickel salt, so no further work was attempted.

Example XVIII

A slurry of 100 grams of benzophenone 3,4,3',4'-tetracarboxylic acid in 500 milliliters of tertiary butanol was hydrogenated over 25 grams of cobalt catalyst (Girdler T897RS) at 170° C. and 1000 pounds per square inch gauge for 1½ hours. The reaction mixture removed from the autoclave was a red pasty mass which smelled of butene. Apparently the catalyst had been incorporated completely as a cobalt salt, so the reaction was discarded.

*Example XIX*

A solution of 100 grams of benzophenone 3,4,3',4'-tetracarboxylic acid in 500 milliliters of para-dioxane was hydrogenated over 25 grams of nickel catalyst (Harshaw 0104) at 130° C. and 1000 pounds per square inch gauge for one hour. The dioxane solution after catalyst removal was evaporated to a light green solid and identified to be benzophenone 3,4,3',4'-tetracarboxylic acid.

*Example XX*

A solution of 100 grams of benzophenone 3,4,3',4'-tetracarboxylic acid in 500 milliliters of para-dioxane was hydrogenated over 15 grams of nickel catalyst (Harshaw 0104) at 180° C. and 1000 pounds per square inch gauge for 2½ hours. The dioxane solution was evaporated to light green solid having a neutralization equivalent of 107. This compares with a neutralization equivalent of 90 for benzhydrol 3,4,3',4'-tetracarboxylic acid and 86 for diphenyl methane 3,4,3',4'-tetracarboxylic acid.

*Example XXI*

A solution of 50 grams of benzophenone 3,4,3',4'-tetracarboxylic dianhydride in 500 milliliters of para-dioxane was hydrogenated over seven grams of nickel catalyst (Harshaw 0104) at 180° C. and 1000 pounds per square inch gauge for one hour. The light green dioxane solution, after catalyst removal, was evaporated to a light green solvent having a neutral equivalent of 110.

Obviously many modifications and variations of the invention as hereinabove set forth can be made without departing from the spirit and scope thereof and therefore only such limitations should be imposed as are indicated in the appended claims.

We claim:

1. A process for preparing an ester of a diaryl carbinol carboxylic acid which comprises hydrogenating a ketone of the formula

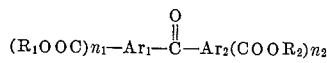

wherein $Ar_1$ and $Ar_2$ are aryl radicals selected from the group consisting of phenyl, biphenyl, naphthyl, phenanthryl, anthryl, indyl, dihydronaphthyl and cyclohexylphenyl, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in a liquid alkanol in the presence of hydrogen and a hydrogenation catalyst selected from the group consisting of nickel, cobalt and copper chromite at a temperature of about 110° to about 180° C.

2. A process for preparing an ester of a diaryl carbinol carboxylic acid which comprises hydrogenating a ketone of the formula

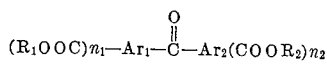

wherein $Ar_1$ and $Ar_2$ are phenyl radicals, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in a liquid alkanol in the presence of hydrogen and a hydrogenation catalyst selected from the group consisting of nickel, cobalt and copper chromite at a temperature of about 110° to about 180° C.

3. A process for preparing an ester of a diaryl carbinol carboxylic acid which comprises hydrogenating a ketone of the formula

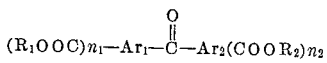

wherein $Ar_1$ and $Ar_2$ are phenyl radicals, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in methanol in the presence of hydrogen and a hydrogenation catalyst selected from the group consisting of nickel, cobalt and copper chromite at a temperature of about 110° to about 180° C.

4. A process for preparing a tetraalkyl ester of benzhydrol 3,4,3',4'-tetracarboxylic acid which comprises hydrogenating the tetraalkyl ester of benzophenone 3,4,3',4'-tetracarboxylic acid in a liquid alkanol in the presence of hydrogen and a hydrogenation catalyst selected from groups consisting of nickel, cobalt and copper chromite at a temperature of about 110° to about 180° C.

5. A process for preparing a tetraalkyl ester of benzhydrol 3,4,3',4'-tetracarboxylic acid which comprises hydrogenating the tetraalkyl ester of benzophenone 3,4,3',4'-tetracarboxylic acid in methanol in the presence of hydrogen and hydrogenation catalyst selected from groups consisting of nickel, cobalt and copper chromite at a temperature of about 110° to about 180° C.

6. A process for preparing an ester of a diaryl carbinol carboxylic acid which comprises hydrogenating a ketone of the formula

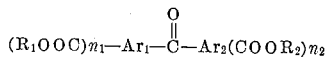

wherein $Ar_1$ and $Ar_2$ are aryl radicals selected from the group consisting of phenyl, biphenyl, naphthyl, phenanthryl, anthryl, indyl, dihydronaphthyl, and cyclohexylphenyl, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in a liquid alkanol in the presence of hydrogen and a hydrogenation catalyst selected from the group consisting of nickel, cobalt and copper chromite at a temperature of about 110° to about 180° C. and thereafter converting the ester so produced by saponification to the corresponding acid.

7. A process for preparing an ester of a diaryl carbinol carboxylic acid which comprises hydrogenating a ketone of the formula

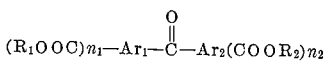

wherein $Ar_1$ and $Ar_2$ are phenyl radicals, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in a liquid alkanol in the presence of hydrogen and a hydrogenation catalyst selected from the group consisting of nickel, cobalt and copper chromite at a temperature of about 110° to about 180° C., and thereafter converting the ester so produced by saponification to the corresponding acid.

8. A process for preparing an ester of a diaryl carbinol carboxylic acid which comprises hydrogenating a ketone of the formula

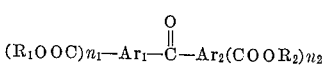

wherein $Ar_1$ and $Ar_2$ are phenyl radicals, $R_1$ and $R_2$ are selected from the group consisting of alkyl radicals having from one to 19 carbon atoms and $n_1$ and $n_2$ have a value from 0 to four, with the sum of $n_1$ and $n_2$ being from one to four, in methanol in the presence of hydrogen and a hydrogenation catalyst selected from the group consisting of nickel, cobalt and copper chromite at a temperature of about 100° to about 180° C. and thereafter converting the ester so produced by saponification to the corresponding acid.

9. A process for preparing the tetraalkyl ester of benzhydrol 3,4,3',4'-tetracarboxylic acid which comprises hydrogenating the tetraalkyl ester of benzophenone 3,4,3',4'-tetracarboxylic acid in a liquid alkanol in the presence of hydrogen and a hydrogenation catalyst selected from groups consisting of nickel, cobalt and copper chromite at a temperature of about 110° to about 180° C., and thereafter converting the ester so produced by saponification to the corresponding acid.

10. A process for preparing the tetraalkyl ester of benzhydrol 3,4,3',4'-tetracarboxylic acid which comprises hydrogenating the tetraalkyl ester of benzophenone 3,4,3',4'- tetracarboxylic acid in methanol in the presence of hydrogen and hydrogenation catalyst selected from groups consisting of nickel, cobalt and copper chromite at a temperature of about 110° to about 180° C., and thereafter converting the ester so produced by saponification to the corresponding acid.

11. A process for preparing the tetraalkyl ester of benzhydrol 3,4,3',4'-tetracarboxylic acid which comprises hydrogenating the tetraalkyl ester of benzophenone 3,4,3',4'-tetracarboxylic acid in a liquid alkanol in the presence of hydrogen and a hydrogenation catalyst selected from groups consisting of nickel, cobalt and copper chromite at a temperature of about 110° to about 180° C., thereafter converting the ester so produced by saponification to the corresponding acid and further converting the acid obtained by heating to the corresponding anhydride.

12. A process for preparing the tetraalkyl ester of benzhydrol 3,4,3',4'-tetracarboxylic acid which comprises hydrogenating the tetraalkyl ester of benzophenone 3,4,3',4'-tetracarboxylic acid in methanol in the presence of hydrogen and hydrogenation catalyst selected from groups consisting of nickel, cobalt and copper chromite at a temperature of about 110° to about 180° C., thereafter converting the ester so produced by saponification to the corresponding acid and further converting the acid obtained by heating to the corresponding anhydride.

13. A compound of the formula

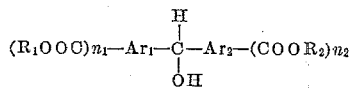

wherein $Ar_1$ and $A_2$ are aryl radicals selected from the group consisting of phenyl, biphenyl, naphthyl, phenanthryl, anthryl, indyl, dihydronaphthyl and cyclohexylphenyl, $R_1$ and $R_2$ are selected from the group consisting of alkyl radicals having from one to 19 carbon atoms and each of $n_1$ and $n_2$ has a value from one to two.

14. A compound of the formula

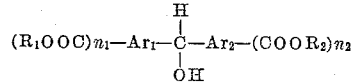

wherein $Ar_1$ and $Ar_2$ are phenyl radicals, $R_1$ and $R_2$ are selected from the group consisting of alkyl radicals having from one to 19 carbon atoms and each of $n_1$ and $n_2$ has a value from one to two.

15. The dialkyl ester of benzhydrol 4,4'-dicarboxylic acid wherein the alkyl portion thereof has from one to 19 carbon atoms.

16. The dimethyl ester of benzhydrol 4,4'-dicarboxylic acid.

17. The diisooctyl ester of benzhydrol 4,4'-dicarboxylic acid.

18. The tetraalkyl ester of benzhydrol 3,4,3',4'-tetracarboxylic acid wherein the alkyl portion thereof has from one to 19 carbon atoms.

19. The tetramethyl ester of benzhydrol 3,4,3',4'-tetracarboxylic acid.

20. The tetraisooctyl ester of benzhydrol 3,4,3',4'-tetracarboxylic acid.

21. A benzhydrol 4,4'-dicarboxylic acid.

22. A benzhydrol 3,4,3',4'-tetracarboxylic acid.

23. A benzhydrol 3,4,3',4'-tetracarboxylic dianhydride.

References Cited by the Examiner

Cornillot: Compt. Rend., vol. 181 (1925), pp. 1071–3.

ALEX MAZEL, *Primary Examiner.*

HENRY R. JILES, *Examiner.*

J. H. TURNIPSEED, *Assistant Examiner.*